(12) United States Patent
Jo (10) Patent No.: US 7,321,474 B1
(45) Date of Patent: Jan. 22, 2008

(54) PHOTOGRAPHIC LENS

(75) Inventor: Sung-ho Jo, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 11/698,331

(22) Filed: Jan. 25, 2007

(30) Foreign Application Priority Data

Sep. 11, 2006 (KR) ....................... 10-2006-0087517

(51) Int. Cl.
*G02B 9/34* (2006.01)
*G02B 13/18* (2006.01)
*G02B 3/02* (2006.01)

(52) U.S. Cl. ........................... 359/773; 359/715

(58) Field of Classification Search ............... 359/753, 359/771, 772, 773, 715
See application file for complete search history.

(56) References Cited

U.S. PATENT DOCUMENTS 7,012,765 B2  3/2006  Matsui et al.
7,177,098 B2 * 2/2007  Arai ........................... 359/715
2005/0105194 A1 * 5/2005  Matsui et al. ............... 359/772
2006/0092528 A1 * 5/2006  Arai ........................... 359/771

FOREIGN PATENT DOCUMENTS

| JP | 2002-365529 A | 12/2002 |
| JP | 2003-149547 A | 5/2003 |
| JP | 2004-102234 A | 4/2004 |
| KR | 2004-0060621 A | 7/2004 |

* cited by examiner

*Primary Examiner*—Alicia M Harrington
(74) *Attorney, Agent, or Firm*—Drinker Biddle & Reath LLP (57) ABSTRACT

A small size photographic lens for the photographic unit of a device such as a camera or a camera phone. The photographic lens includes: a first lens having positive refractive power; a second lens having negative refractive power and a convex surface facing the object side; a third lens having positive refractive power; and a fourth lens having negative refractive power at the center portion, in which the negative refractive power becomes weaker from the center portion toward the peripheral portion of the fourth lens, and having a positive refractive power at the peripheral portion thereof, the lenses being numbered in order of location from the object.

24 Claims, 11 Drawing Sheets

% DISTORTION

% DISTORTION

FIG. 13

PHOTOGRAPHIC LENS

CROSS-REFERENCE TO RELATED PATENT APPLICATIONS

This application claims the benefit of Korean Patent Application No. 10-2006-0087517, filed on Sep. 11, 2006, in the Korean Intellectual Property Office, the disclosure of which is incorporated herein in its entirety by reference.

BACKGROUND OF THE INVENTION

1. Field of the Invention

The present invention relates to a photographic lens, and more particularly, to a small size photographic lens used in a camera having a image sensing device such as a charge coupled device (CCD) or a complementary metal oxide semiconductor (CMOS).

2. Description of the Related Art

Recently, mobile phones having digital cameras using solid state image sensing devices have been widely distributed, the cameras having high image qualities of 3-million pixels or more in view of photographic performance.

Accordingly, a small and light photographic lens that can be fabricated with low fabrication costs is required for such cameras. In addition, in a high-pixel camera module of 3-million pixels or more, a photographic lens optical system that is compact and has an auto-focusing function is required.

Japanese Laid-open Patent No. 2002-365529 and Japanese Laid-open Patent No. 2003-149547 disclose photographic lenses for cameras using solid state image sensing devices.

In Japanese Laid-open Patent No. 2002-365529, the photographic lens arranges an aperture stop on an object side thereof, a first lens having positive refractive power, a second lens having negative refractive power, a third lens having positive refractive power, and a fourth lens having negative refractive power in order of location from the object side.

Japanese Laid-open Patent No. 2003-149547 discloses a photographic lens arranging an aperture stop on an object side thereof, and including a first lens having positive refractive power, a second lens having negative refractive power, a third lens having positive refractive power, and a fourth lens having positive refractive power.

The conventional photographic lens having the above structure has a limitation in providing a compact photographic lens maintaining a high quality imaging for an object positioned a long distance and a short distance away from the lens and having a relatively long back focal length.

SUMMARY OF THE INVENTION

The present invention provides a compact photographic lens with high quality imaging at a long distance and at a short distance (about 10 cm) from an object and has a long back focal length, and thereby, the image quality is still excellent when automatic focusing is performed.

According to an aspect of the present invention, there is provided a photographic lens including: a first lens having positive refractive power; a second lens having negative refractive power and a convex surface facing an object side; a third lens having positive refractive power; and a fourth lens having negative refractive power at the center portion, in which the negative refractive power becomes weaker from the center portion toward the peripheral portion of the fourth lens, and having a positive refractive power at the peripheral portion thereof, wherein the lenses are numbered in order of location from the object.

According to another aspect of the present invention, there is provided a photographic lens including: a first lens having positive refractive power; a second lens having negative refractive power at the center portion, in which the negative refractive power becomes weaker from the center portion toward the peripheral portion of the second lens, and having positive refractive power at the peripheral portion thereof; a third lens having positive refractive power; and a fourth lens having negative refractive power, wherein the lenses are numbered in order of location from the object.

According to another aspect of the present invention, there is provided a photographic lens including: a first lens having positive refractive power; a second lens having negative refractive power; a third lens having positive refractive power; and a fourth lens having negative refractive power at the center portion, in which the negative refractive power becomes weaker from the center portion toward the peripheral portion of the fourth lens, and having a positive refractive power at the peripheral portion thereof, wherein the lenses are numbered in order of location from the object and the photographic lens satisfies the condition $0.5 < (r_4 + r_5)/(r_4 - r_5) < 1.8$, where $r_4$ is the radius of curvature of the surface of the second lens facing the object, and $r_5$ is the radius of curvature of the surface of the second lens facing the image.

Following conditions may be satisfied, $$1.4 \leq f/f_1 \leq 1.9$$

$$0.6 \leq |f/f_2| \leq 1.5$$

$$20 < V_1 - V_2 < 50$$

$$0.2 \leq |r_7|/f \leq 0.4$$

$$0.5 \leq r_8/f \leq 1.0$$

where f denotes the focal length of the entire photographic lens, and $f_1$ and $f_2$ denote the focal length of the first and second lens, $V_1$ and $V_2$ denote Abbe constants of the first and second lenses, $r_7$ denotes the radius of curvature of a surface of the third lens facing an image, and $r_8$ denotes the radius of curvature of the surface of the fourth lens facing the object.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

FIGS. 1, 4, 7, and 10 are diagrams showing optical arrangements of photographic lenses according to embodiments of the present invention.

Referring to the drawings, the photographic lens according to the embodiments of the present invention includes a first lens I having positive refractive power, a second lens II having negative refractive power, a third lens III having positive refractive power, and a fourth lens IV having negative refractive power in order of location from an object OBJ. In addition, an aperture stop S is disposed between the first lens I and the object OBJ. In addition, a filter V blocking light of infrared wavelengths may be disposed between the fourth lens IV and an image IMG.

The second lens II is convex on the side of the object OBJ and concave on the side of the image IMG. In addition, the second lens II can be formed to have spherical surfaces as in the photographic lenses shown in FIGS. 1 and 4, or can be formed to have aspheric surfaces as in the photographic lenses shown in FIGS. 7 and 10. Alternatively, one of the two surfaces of the second lens II can be formed to be an aspheric surface.

In addition, the fourth lens IV has a negative refractive power at the center portion thereof, and the negative refractive power becomes weaker toward an edge of the fourth lens IV, and thus, the fourth lens IV has a positive refractive power at the peripheral portions thereof. In addition, at least one surface of the fourth lens IV may be formed to be an aspheric surface.

The photographic lens having the above structures according to the embodiments thereof satisfies at least one of following conditional expressions 1 through 6.

$$0.5 < (r_4+r_5)/(r_4-r_5) < 1.8 \quad (1)$$

Here, $r_4$ is the radius of curvature of the surface of the second lens II facing the object OBJ, and $r_5$ is the radius of curvature of the surface of the second lens II facing the image IMG. Expression 1 represents the shape of the second lens II, that is, a meniscus lens having a concave surface facing the image IMG. Here, if the value of $(r_4+r_5)/(r_4-r_5)$ is smaller than 0.5 in Expression 1, the refractive power of the second lens II becomes strong, and thus, it is difficult to compensate for off-axis aberrations. On the other hand, if the value of $(r_4+r_5)/(r_4-r_5)$ is larger than 1.8 in Expression 1, the refractive power of the second lens II becomes too weak.

$$1.4 \leq f/f_1 \leq 1.9 \quad (2)$$

Here, f is the focal length of the entire lens, and $f_1$ is the focal length of the first lens I.

Expression 2 represents conditions of the refractive power of the first lens I. If the value of $f/f_1$ is smaller than 1.4 in Expression 2, the refractive power of the first lens I becomes weak and the total length of the photographic lens system increases, and thus, the photographic lens cannot be compact-sized. On the other hand, if the value of $f/f_1$ is larger than 1.9 in Expression 2, the refractive power of the first lens I increases greatly, and thus, spherical aberrations and chromatic aberrations increase.

$$0.6 \leq f/|f_2| \leq 1.5 \quad (3)$$

Here, f is the focal length of the entire lens, and $f_2$ is the focal length of the second lens II.

Expression 3 represents conditions of the refractive power of the lenses that have negative refractive power. That is, in the photographic lens, the second lens II and the fourth lens IV have negative refractive power, but most of the negative refractive power is concentrated on the second lens II. Therefore, Expression 3 represents the conditions of distributing the refractive power to the lenses having the negative refractive power in the entire photographic lens system.

The above Expression 3 represents conditions for compensating for chromatic aberrations and spherical aberrations generated by the first and third lenses I and III. If the value of $f/|f_2|$ is larger than 1.5 in Expression 3, there may be over-compensation for chromatic aberrations and it is difficult to form the lens system having small size. In addition, if the value of $f/|f_2|$ is smaller than 0.6 in Expression 3, there may be insufficient compensation for chromatic aberrations.

$$20 < V_1 - V_2 < 50 \quad (4)$$

Here, $V_1$ is an Abbe constant of the first lens I, and $V_2$ is an Abbe constant of the second lens II.

Expression 4 represents conditions of dispersion of the first and second lenses I and II having positive refractive power. If the value of $V_1-V_2$ is smaller than 20 in Expression 4, the refractive power of the first and second lenses I and II is large, and there may be problems with monochromatic aberration or fabrication of the lens. If the value of $V_1-V_2$ is larger than 50 in Expression 4, the refractive power becomes too weak.

$$0.2 \leq |r_7|/f \leq 0.4 \quad (5)$$

Here, f is the focal length of the entire lens, and $r_7$ is the radius of curvature of the surface facing the image IMG of the third lens.

Expression 5 relates to the shape of the third lens III. That is, the third lens III is formed as a meniscus lens which is convex to the image IMG. Since the third lens III has relatively low positive refractive power compared to the first lens I, the third lens III reduces the refractive power of the first and second lenses I and II, and compensates for off-axial aberration.

If the value of $|r_7|/f$ is larger than 0.4 in Expression 5, the angle of the off-axial principal ray is reduced, and it is difficult to control the fourth lens IV. In addition, if the value of $|r_7|/f$ is smaller than 0.2 in Expression 5, the tele-centricity of the lens is improved, but coma flare increases and performance of the lens is degraded.

$$0.5 \leq r_8/f \leq 1.0 \qquad (6)$$

Here, f is the focal length of the entire lens, and $r_8$ is the radius of curvature of the surface of the fourth lens IV facing the object OBJ.

Expression 6 represents conditions related to the shape of the fourth lens IV, mainly the tele-centricity of the image IMG and distortion. In Expression 6, when the value of $r_8/f$ exceeds the highest value and the lowest value, the tele-centricity and the distortion aberration are degraded.

Hereinafter, embodiments of the present invention will be described in detail with reference to lens data and accompanying drawings.

Figure 1:
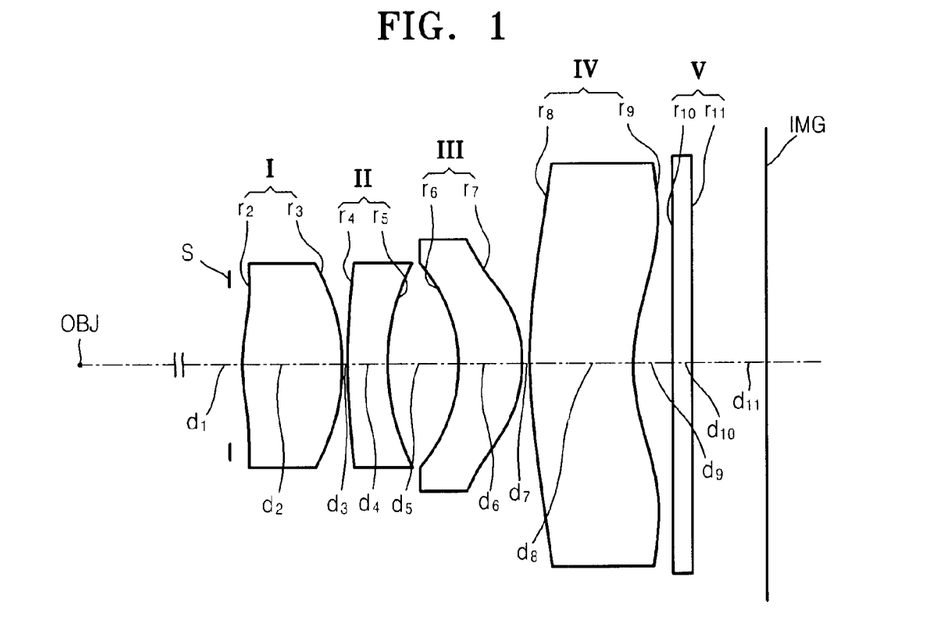
FIG. 1 is a diagram of an optical arrangement of a photographic lens according to an embodiment of the present invention.
Figure 2:
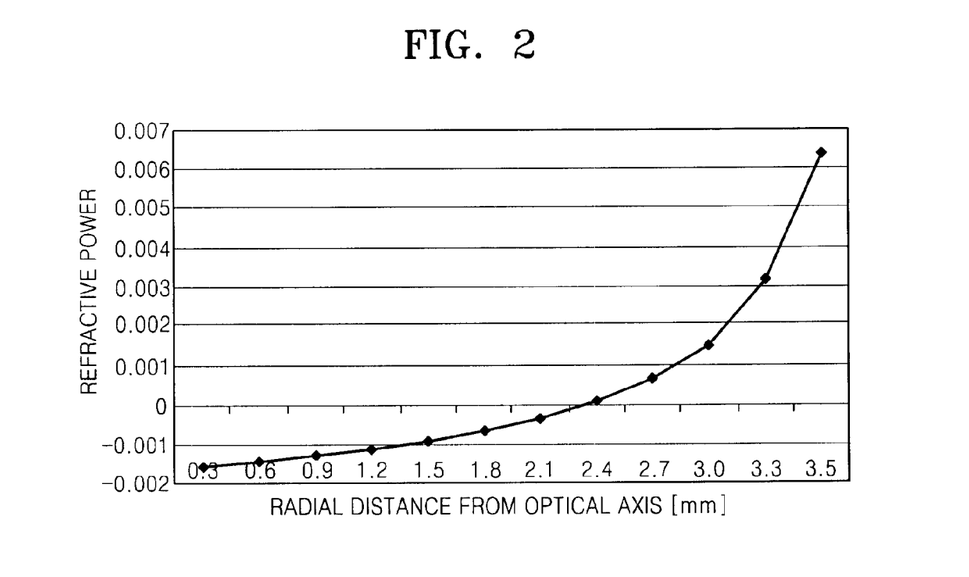
FIG. 2 is a graph showing the refractive power with respect to the radial distance from the optical axis of the fourth lens in the photographic lens of FIG. 1.

FIG. 1 is a cross-sectional view of an optical arrangement of the photographic lens according to an embodiment of the present invention. FIG. 2 is a graph showing refractive power of the fourth lens according to the radial distance from the optical axis in the photographic lens of FIG. 1. Referring to FIGS. 1 and 2, the fourth lens IV has negative refractive power at a center portion thereof, and then, the refractive power becomes weaker toward the peripheral portion of the fourth lens IV. Then, the fourth lens IV has positive refractive power at the peripheral portion thereof.

Table 1 and Table 2 illustrate radiuses of curvatures, lens thickness or distance between lenses (along the optical axis), refractive index, dispersion, and aspheric coefficients of the aspheric lens of the lenses constituting the photographic lens of FIG. 1.

Here, r denotes the radius of curvature, d is the lens thickness or the distance between lenses (along the optical axis), $N_d$ is the refractive index for light of a wavelength of 589.2 nm, and $v_d$ denotes the Abbe constant defined by Equation 7. The number of surface indicated with * denotes that the surface is an aspheric surface. In addition, the units of the r and d values is mm.

$$v_d = \frac{N_d - 1}{N_F - N_C} \qquad (7)$$

Here, $N_F$ denotes the refractive index for light of a wavelength of 486.1 nm, and $N_C$ denotes the refractive index for light of a wavelength of 656.3 nm.

In the photographic lens according to the current embodiment, F-number (Fno) is 2.65, the focal length is 6.1 mm, and the viewing angle ($2\omega$) is 61.1°.

In addition, in the photographic lens according to the embodiments of the present invention, each of the aspheric surfaces satisfies the following Equation 8.

$$x = \frac{c'y^2}{1+\sqrt{1-(K+1)c'^2 y^2}} + Ay^4 + By^6 + Cy^8 + Dy^{10} + Ey^{12} \qquad (8)$$

Here, x denotes a displacement from the vertex of lens surface in the optical axis direction, y denotes a distance in the direction perpendicular to the optical axis, c' denotes a reciprocal of the radius of curvature at the vertex of the lens (=1/r), K denotes a Conic constant, and A, B, C, D, and E are aspheric coefficients.

TABLE 1

| lens | surface | r | d | $N_d$ | $v_d$ |
|---|---|---|---|---|---|
| | OBJ | | | | |
| | S | ∞ | 0.10 | | |
| I | *2 | 5.13810 | 1.55 | 1.623 | 58.16 |
| | *3 | −3.64E+00 | 0.10 | | |
| II | 4 | 14.48113 | 0.62 | 1.805 | 25.46 |
| | 5 | 3.51241 | 1.11 | | |
| III | *6 | −1.87E+00 | 1.00 | 1.531 | 56.51 |
| | *7 | −1.68E+00 | 0.10 | | |
| IV | *8 | 4.97038 | 1.62 | 1.531 | 56.51 |
| | *9 | 2.52666 | 0.41 | | |
| V | 10 | ∞ | 0.30 | 1.5168 | 64.2 |
| | 11 | ∞ | 1.40 | | |
| | IMG | ∞ | 0 | | |

TABLE 2

| surface | K | A | B | C | D | E |
|---|---|---|---|---|---|---|
| 2 | −1.925311 | −0.010 | −3.32907E−03 | 4.41693E−04 | −6.0272E−04 | |
| 3 | 1.993164 | | −1.3416E−03 | −2.3505E−04 | 1.26E−05 | |
| 6 | −2.551042 | −8.560 | −3.94754E−03 | 1.52098E−03 | 4.96E−05 | 7.26E−05 |
| 7 | −1.856752 | −8.627 | 1.1826E−04 | −2.04229E−04 | 2.43248E−04 | −2.79E−07 |
| 8 | −6.140874 | −0.016 | 2.04705E−03 | −9.47E−05 | 4.46E−07 | 1.61E−07 |
| 9 | −7.346669 | −0.010 | 8.06269E−04 | −6.31E−05 | 2.53E−06 | −2.79E−08 |

Figure 3A:
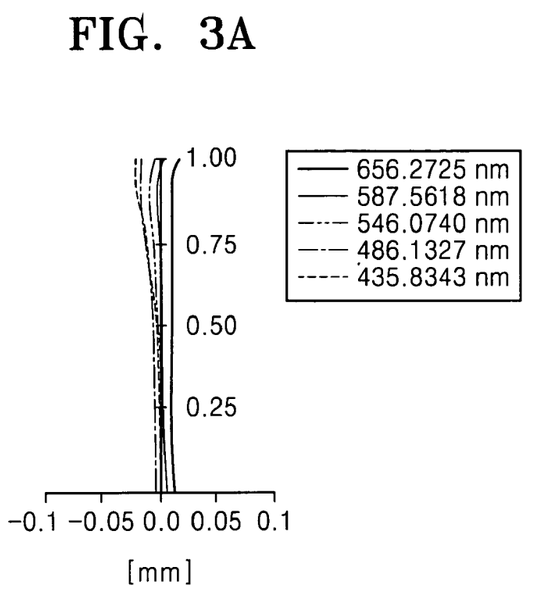
FIGS. 3A through 3C are graphs respectively showing spherical aberration in a longitudinal direction, field curvature, and distortion aberration of the photographic lens of FIG. 1.
Figure 3B:
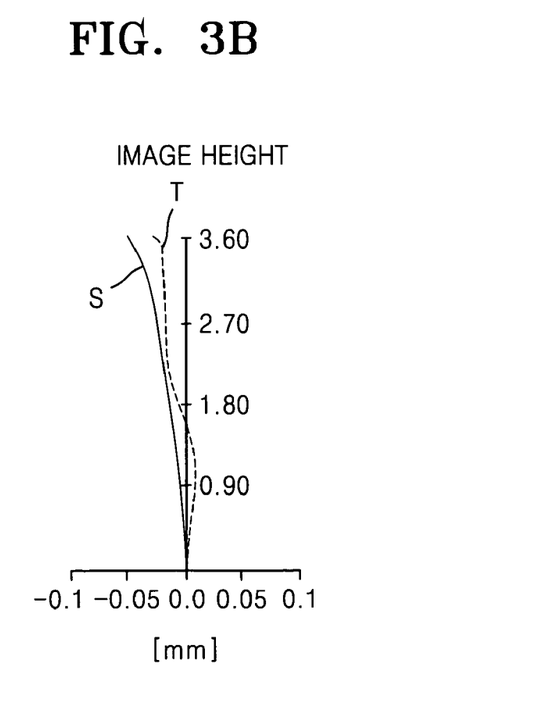
Figure 3C:
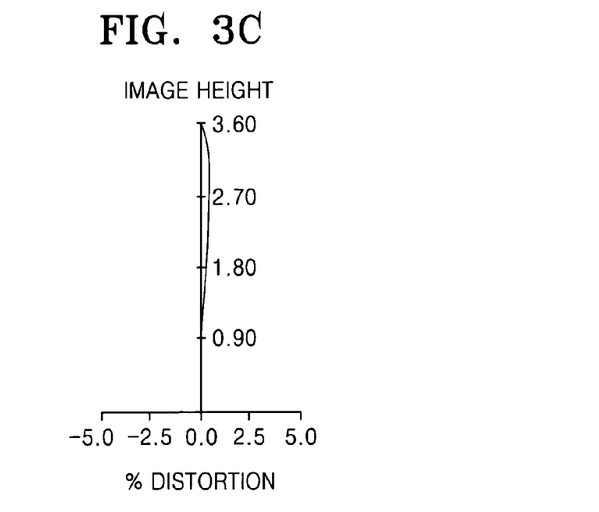

FIGS. 3A through 3C are graphs showing the spherical aberration, the astigmatic field curvature, and distortion of the photographic lens according to the current embodiment.

FIG. 3A illustrates the spherical aberration of the photographic lens with respect to the rays of various wavelengths. That is, the spherical aberrations are shown with respect to the lights having wavelengths of 435.8343 nm, 486.1327 nm, 546.0740 nm, 587.5618 nm, and 656.2725 nm. FIG. 3B illustrates the astigmatic field curvature of the photographic lens, that is, the tangential field curvature (T) and the sagittal field curvature (S) of the photographic lens. FIG. 3C illustrates percent distortion (% distortion) of the photographic lens.

Figure 4:
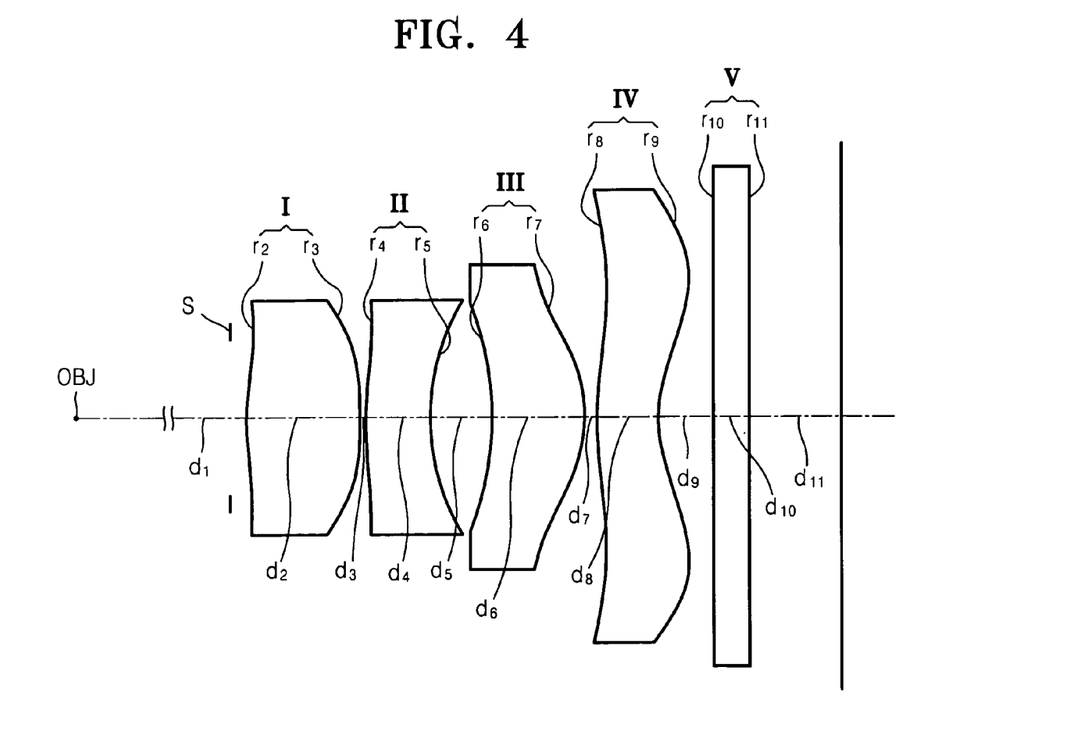
FIG. 4 is a diagram of an optical arrangement of a photographic lens according to another embodiment of the present invention.
Figure 5:
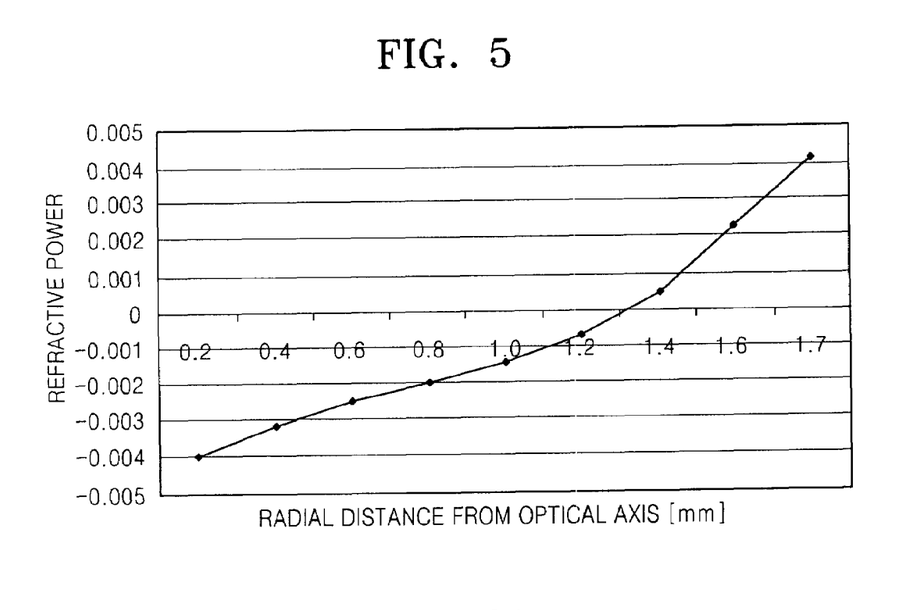
FIG. 5 is a graph showing the refractive power with respect to the radial distance from the optical axis of the fourth lens in the photographic lens of FIG. 4.

FIG. 4 is a cross-sectional view of an optical arrangement of the photographic lens according to another embodiment of the present invention. In addition, FIG. 5 is a graph showing the refractive power of the fourth lens according to the radial distance from the optical axis in the photographic lens of FIG. 4. Referring to FIGS. 4 and 5, the fourth lens IV has negative refractive power at a center portion thereof, and then, the negative refractive power becomes weaker toward the peripheral portion of the fourth lens IV. Then, the fourth lens IV has the positive refractive power at the peripheral portion thereof.

Table 3 and Table 4 illustrate radiuses of curvatures, lens thickness or distance between lenses (along the optical axis), refractive index, dispersion, and aspheric coefficients of the aspheric lens among the lenses constituting the photographic lens of FIG. 4.

Here, r denotes the radius of curvature, d is the lens thickness or the distance between lenses (along the optical axis), $N_d$ is the refractive index for light of a wavelength of 486.1 nm, and $v_d$ denotes the Abbe constant. The number of surface indicated with * denotes that the surface is an aspheric surface. In addition, the units of the r and d values is mm.

In the photographic lens according to the current embodiment, F-number (Fno) is 2.73, the focal length is 3.6 mm, and the viewing angle (2ω) is 63.3°.

Figure 6A:
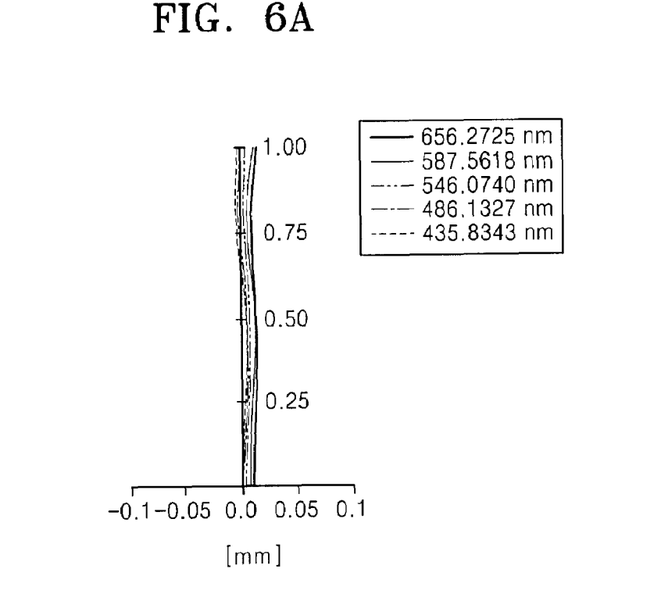
FIGS. 6A through 6C are graphs respectively showing spherical aberration in a longitudinal direction, field curvature, and distortion aberration of the photographic lens of FIG. 4.
Figure 6B:
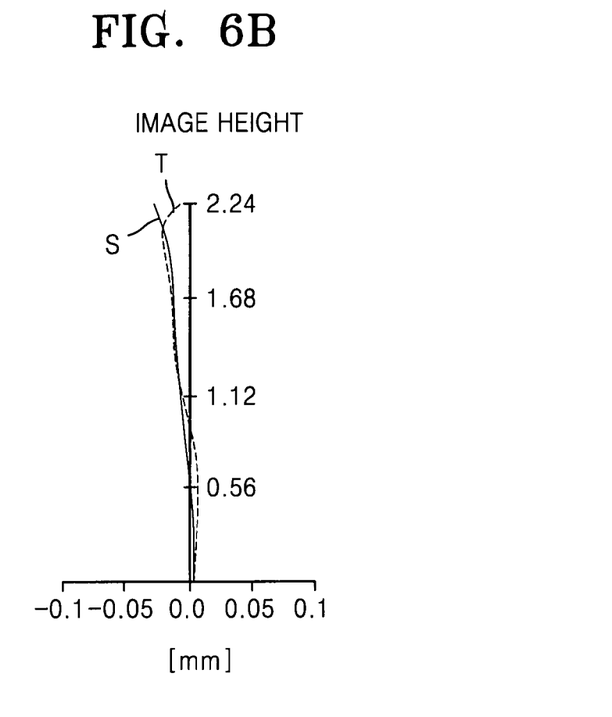
Figure 6C:
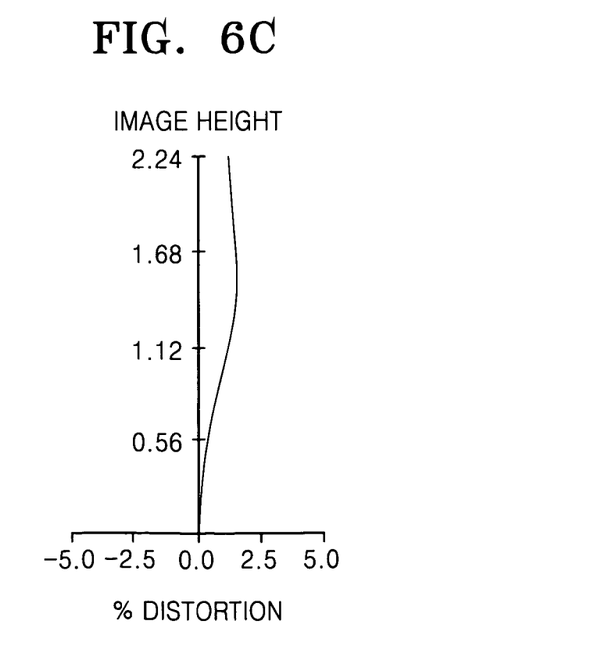

FIGS. 6A through 6C are graphs showing the spherical aberration, the astigmatic field curvature, and distortion of the photographic lens according to the current embodiment.

Figure 7:
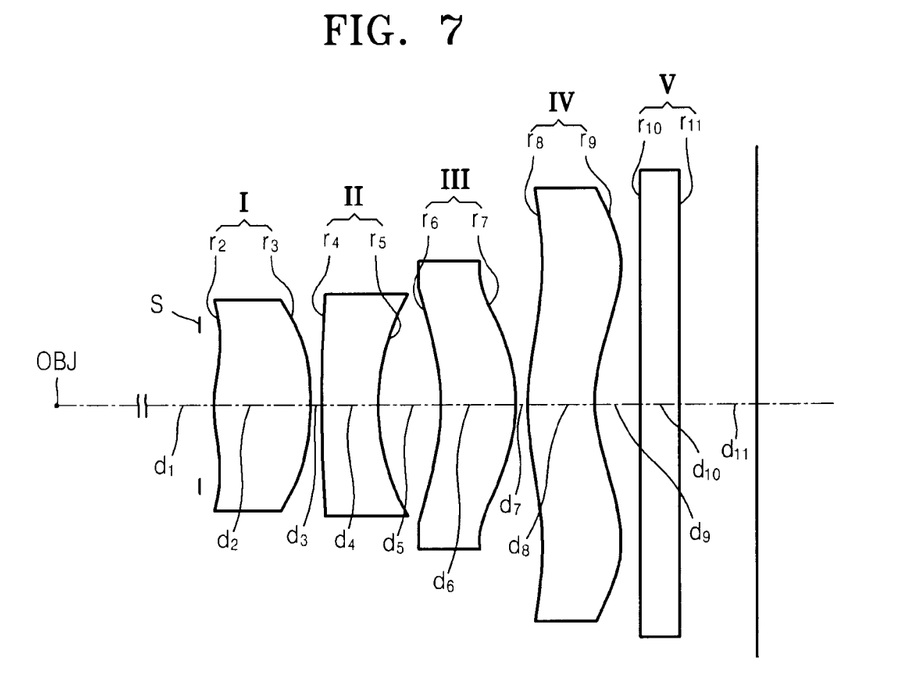
FIG. 7 is a diagram of an optical arrangement of a photographic lens according to another embodiment of the present invention.
Figure 8:
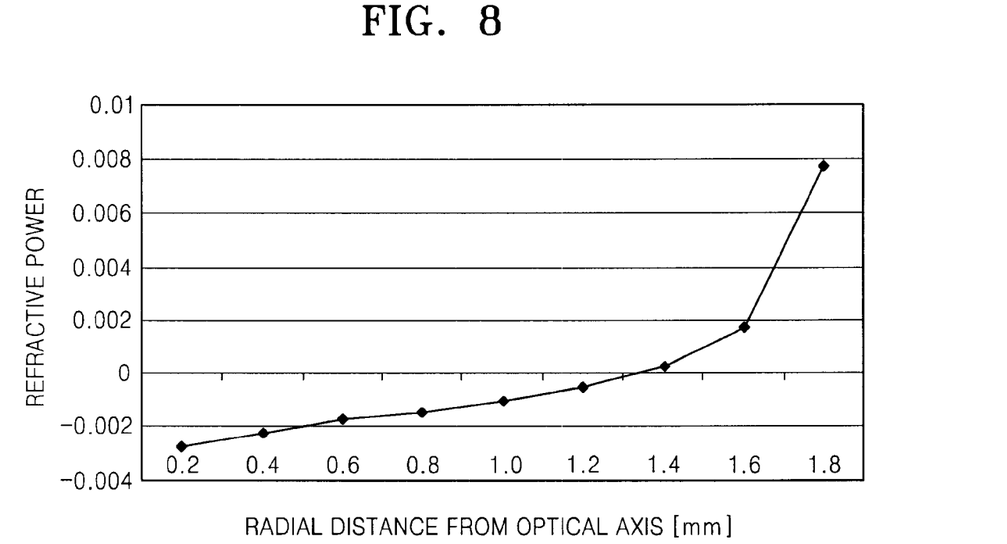
FIG. 8 is a graph showing the refractive power with respect to the radial distance from the optical axis of the fourth lens in the photographic lens of FIG. 7.

FIG. 7 is a cross-sectional view of an optical arrangement of the photographic lens according to another embodiment of the present invention. In addition, FIG. 8 is a graph showing the refractive power of the fourth lens according to the radial distance from the optical axis in the photographic lens of FIG. 7.

Table 5 and Table 6 illustrate radiuses of curvatures, lens thickness or distance between lenses (along the optical axis), refractive index, dispersion, and aspheric coefficients of the aspheric lens among the lenses constituting the photographic lens of FIG. 7. Here, r denotes the radius of curvature, d is the lens thickness or the distance between lenses (along the optical axis), $N_d$ is the refractive index for light of a wavelength of 486.1 nm, and $v_d$ denotes the Abbe constant. The number of surface indicated with * denotes that the surface is an aspheric surface. In addition, the units of the r and d values is mm.

In the photographic lens according to the current embodiment, F-number (Fno) is 2.78, the focal length is 3.62 mm, and the viewing angle (2ω) is 62.3°. The photographic lens according to the current embodiment includes the first through fourth lenses like the photographic lens according to the first embodiment, however, the second lens of the photographic lens according to the current embodiment has both surfaces formed as aspheric surfaces.

TABLE 3

| lens | surface | r | d | $N_d$ | $v_d$ |
|---|---|---|---|---|---|
| | OBJ | | | | |
| | S | ∞ | 0.10 | | |
| I | *2 | 3.04912 | 0.91 | 1.665 | 55.18 |
| | *3 | −2.29E+00 | 0.05 | | |
| II | 4 | 8.37265 | 0.50 | 1.805 | 25.46 |
| | 5 | 1.79545 | 0.49 | | |
| III | *6 | −1.83E+00 | 0.73 | 1.531 | 56.51 |
| | *7 | −1.07E+00 | 0.10 | | |
| IV | *8 | 2.43228 | 0.50 | 1.531 | 56.51 |
| | *9 | 1.08214 | 0.22 | | |
| V | 10 | ∞ | 0.30 | 1.5168 | 64.2 |
| | 11 | ∞ | 0.90 | | |
| | IMG | ∞ | 0 | | |

TABLE 5

| lens | surface | r | d | $N_d$ | $v_d$ |
|---|---|---|---|---|---|
| | OBJ | | | | |
| | S | ∞ | 0.10 | | |
| I | *2 | 3.78920 | 0.81 | 1.665 | 55.18 |
| | *3 | −2.32E+00 | 0.10 | | |
| II | *4 | 10.63931 | 0.50 | 1.632 | 23.41 |
| | *5 | 1.98493 | 0.54 | | |
| III | *6 | −1.47E+00 | 0.66 | 1.531 | 56.51 |
| | *7 | −1.15E+00 | 0.10 | | |
| IV | *8 | 2.21810 | 0.57 | 1.531 | 56.51 |
| | *9 | 1.21368 | 0.22 | | |
| V | 10 | ∞ | 0.30 | 1.5168 | 64.2 |
| | 11 | ∞ | 0.90 | | |
| | IMG | ∞ | 0 | | |

TABLE 4

| surface | K | A | B | C | D |
|---|---|---|---|---|---|
| 2 | −3.83790983 | −0.044274393 | −0.008290139 | −0.060659342 | |
| 3 | 2.313971646 | 0.010650736 | −0.018720789 | −0.010378962 | |
| 6 | −7.631957952 | 0.015563449 | 0.001909292 | 0.01994465 | −0.020044283 |
| 7 | −4.249496662 | −0.058320073 | 0.046884303 | 0.000424818 | |
| 8 | −5.149200069 | −0.122315689 | 0.035432068 | −0.004870119 | 0.000407197 |
| 9 | −6.47494203 | −0.076936991 | 0.012977885 | −0.002194545 | 4.79E−05 |

TABLE 6

| surface | K | A | B | C | D | E |
|---|---|---|---|---|---|---|
| 2 | −8.616130275 | −0.063241641 | −0.050815281 | −0.046599875 | | |
| 3 | 3.268773514 | −0.077511005 | 0.074151101 | −0.03012975 | | |
| 4 | 9.990635194 | −0.053540125 | 0.059450141 | 0.069117638 | −0.057610299 | |
| 5 | 0.220255338 | 0.046499238 | −0.061195188 | 0.04370191 | 0.074757948 | −0.063781461 |
| 6 | −2.95889769 | 0.162340544 | −0.136242178 | 0.066054647 | −0.019301157 | 0.007619643 |
| 7 | −3.723590757 | 0.022073156 | −0.000867466 | 0.01427323 | −0.002719558 | −0.000622279 |
| 8 | −3.255768137 | −0.112096864 | 0.027897189 | −0.000811167 | −0.001358061 | −0.00024817 |
| 9 | −7.0443226 | −0.061732962 | 0.008059854 | −0.001018756 | −8.15E−05 | −3.92E−06 |

Figure 9A:
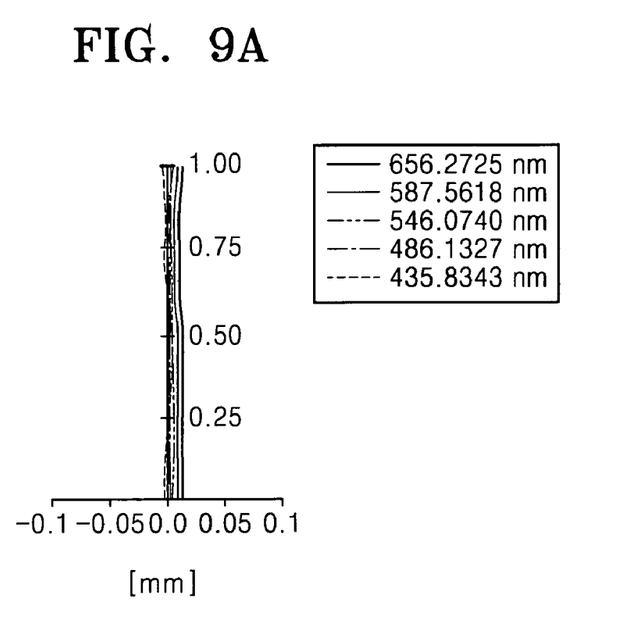
FIGS. 9A through 9C are graphs respectively showing spherical aberration in a longitudinal direction, field curvature, and distortion aberration of the photographic lens of FIG. 7.
Figure 9B:
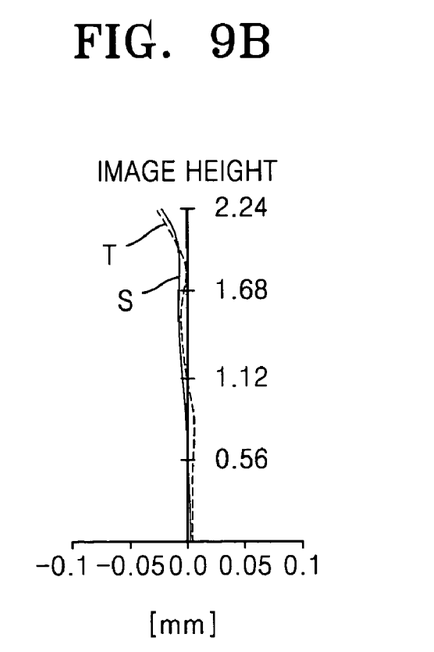
Figure 9C:
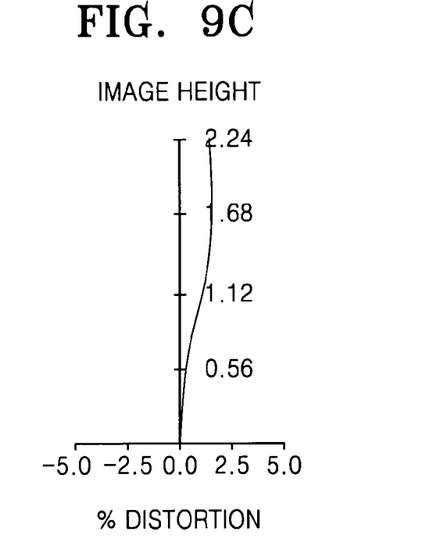

FIGS. 9A through 9C are graphs showing the spherical aberration, the astigmatic field curvature, and distortion of the photographic lens according to the current embodiment.

Figure 10:
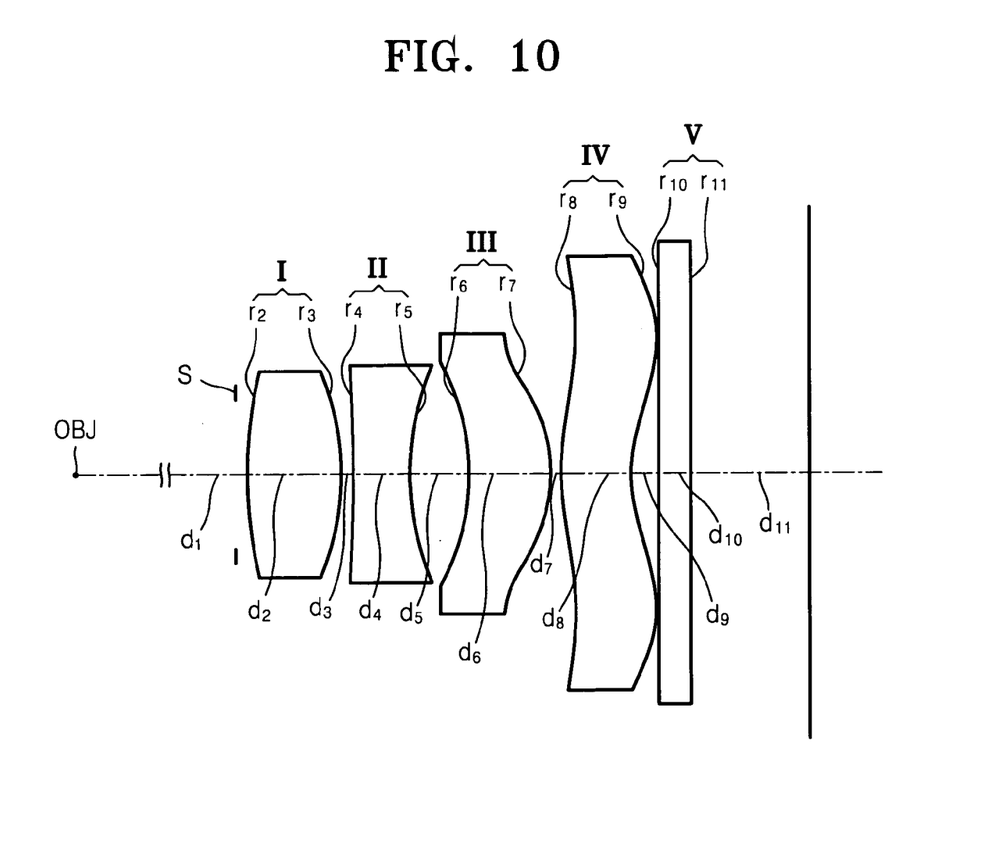
FIG. 10 is a diagram of an optical arrangement of a photographic lens according to another embodiment of the present invention.
Figure 11:
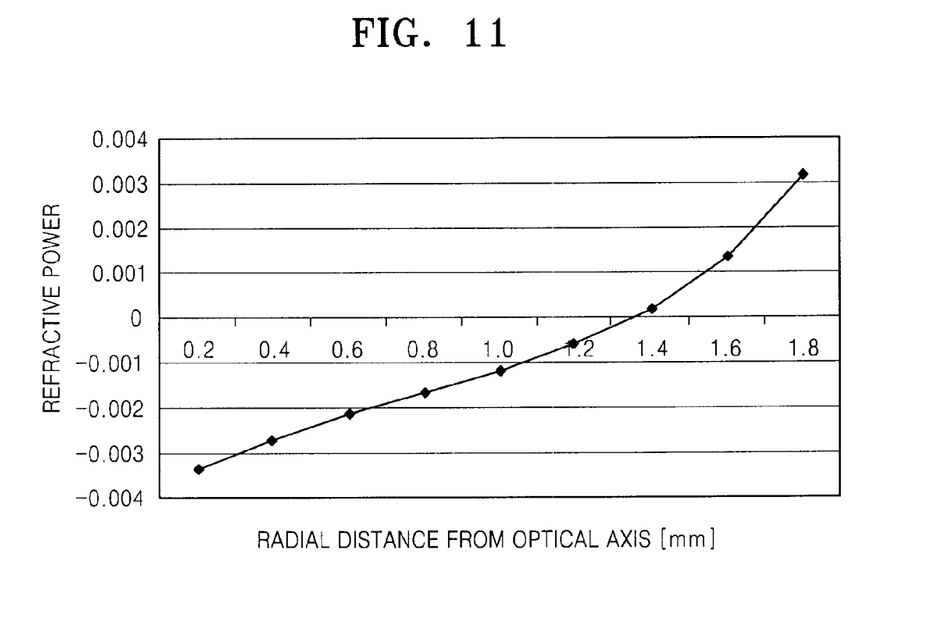
FIG. 11 is a graph showing the refractive power with respect to the radial distance from the optical axis of the fourth lens from an optical axis in the photographic lens of FIG. 10.

FIG. 10 is a cross-sectional view of an optical arrangement of the photographic lens according to another embodiment of the present invention. In addition, FIG. 11 is a graph showing the refractive power of the fourth lens according to the radial distance from the optical axis in the photographic lens of FIG. 10, and FIG. 13 is a graph showing the refractive power of the second lens according the radial distance from the optical axis in the photographic lens of FIG. 10.

Table 7 and Table 8 illustrate radiuses of curvature, lens thickness or distance between lenses (along the optical axis), refractive index, dispersion, and aspheric coefficients of the aspheric lens among the lenses constituting the photographic lens of FIG. 10 according to the current embodiment. Here, r denotes the radius of curvature, d is the lens thickness or the distance between lenses (along the optical axis), $N_d$ is the refractive index for light of a wavelength of 486.1 nm, and $v_d$ denotes the Abbe constant. The number of surface indicated with * denotes that the surface is an aspheric surface. In addition, the units of the r and d values is mm.

In the photographic lens according to the current embodiment, F-number (Fno) is 2.81, the focal length is 3.71 mm, and a viewing angle (2ω) is 64°. The photographic lens according to the current embodiment includes the first through fourth lenses like the photographic lens according to the first embodiment, but the second lens of the photographic lens according to the current embodiment has both surfaces formed as aspheric surfaces.

Figure 13:
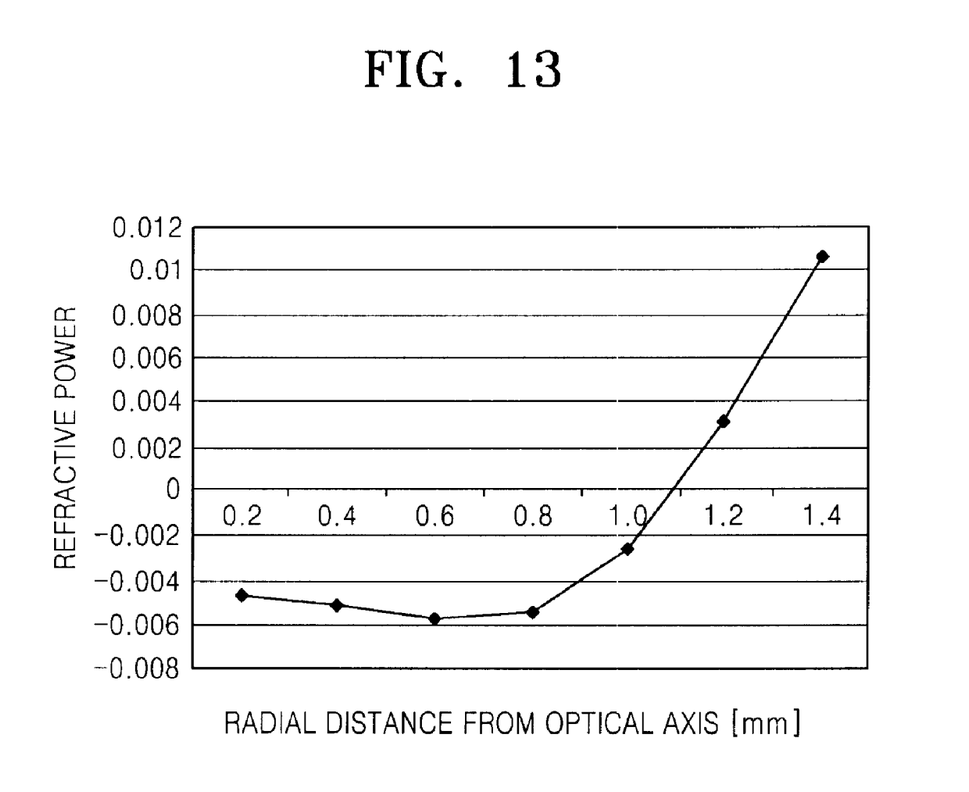
FIG. 13 is a graph showing the refractive power with respect to the radial distance from the optical axis of the second lens in the photographic lens of FIG. 10.

In addition, the second lens is different from those of the photographic lenses according to the previous embodiments in that the refractive power of the second lens is changed as shown in FIG. 13. That is, the second lens II has negative refractive power at a center portion thereof, and then, the negative refractive power becomes weaker toward the peripheral portion of the second lens II. Then, the second lens II has the positive refractive power at the peripheral portion thereof. When the second lens II is formed as above, the spherical aberration of the first lens I can be compensated during reducing of the total length of the entire photographic lens system.

TABLE 7

| lens | surface | r | d | $N_d$ | $v_d$ |
|---|---|---|---|---|---|
| | OBJ | | | | |
| | S | ∞ | 0.10 | | |
| I | *2 | 2.70019 | 0.79 | 1.690 | 53.2 |
| | *3 | −4.00E+00 | 0.11 | | |
| II | 4 | −13.58901 | 0.50 | 1.632 | 23.41 |
| | 5 | 3.33198 | 0.50 | | |
| III | *6 | −1.70E+00 | 0.72 | 1.531 | 56.51 |
| | *7 | −1.11E+00 | 0.10 | | |
| IV | *8 | 2.75755 | 0.60 | 1.531 | 56.51 |
| | *9 | 1.26724 | 0.23 | | |
| V | 10 | ∞ | 0.30 | 1.5168 | 64.2 |
| | 11 | ∞ | 1.40 | | |
| | IMG | ∞ | 0 | | |

TABLE 8

| surface | K | A | B | C | D |
|---|---|---|---|---|---|
| 2 | −0.522121898 | −0.033722985 | −0.045294075 | | |
| 3 | −3.593909483 | −0.100991211 | 0.022045834 | | |
| 4 | −9.708111147 | −0.050825087 | 0.067053515 | 0.009401081 | |
| 5 | 3.200913829 | 0.03552237 | −0.008817345 | 0.010284341 | −0.011504409 |
| 6 | 1.510571533 | 0.167730049 | −0.033457948 | 0.043400868 | |
| 7 | −3.810747259 | −0.05296124 | 0.043372534 | | |
| 8 | −0.591785127 | −0.102558802 | 0.020247043 | −0.00141217 | |
| 9 | −7.150607794 | −0.05281454 | 0.005366605 | −0.000686898 | |

Figure 12A:
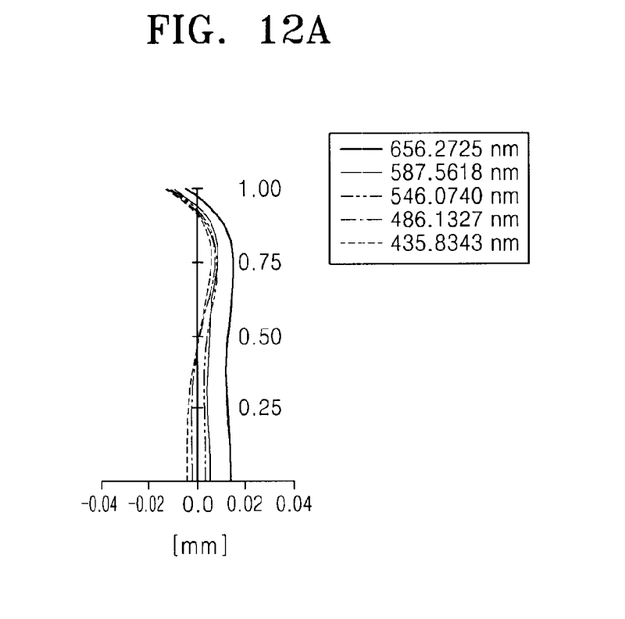
FIGS. 12A through 12C are graphs respectively showing spherical aberration in a longitudinal direction, field curvature, and distortion aberration of the photographic lens of FIG. 10.
Figure 12B:
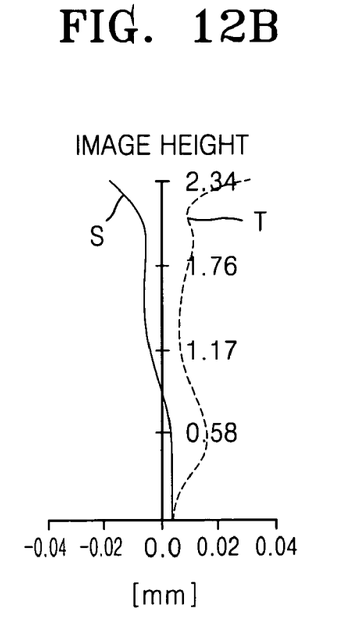
Figure 12C:
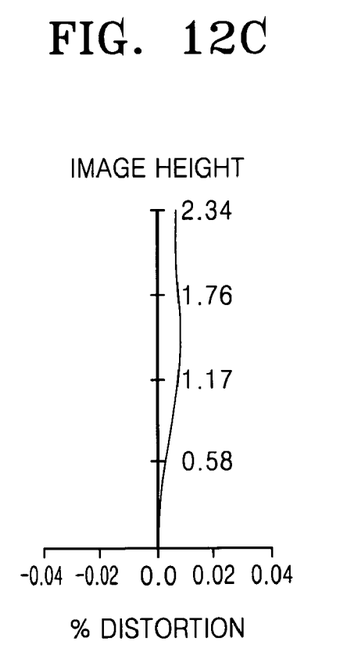

FIGS. 12A through 12C are graphs showing spherical aberration, astigmatic field curvature, and distortion of the photographic lens according to the current embodiment.

In addition, in the above embodiments, values of Expressions 1 through 6 are shown in following Table 9.

TABLE 9

|  |  | embodiment 1 | embodiment 2 | embodiment 3 | embodiment 4 |
|---|---|---|---|---|---|
| Expression 1 | $(r_4 + r_5)/(r_4 - r_5)$ | 1.64 | 1.546 | 1.459 | 0.606 |
| Expression 2 | $f/f_1$ | 1.667 | 1.77 | 1.59 | 1.52 |
| Expression 3 | $f/|f_2|$ | 1.042 | 1.234 | 0.92 | 0.9 |
| Expression 4 | $V_1 - V_2$ | 32.74 | 29.7 | 31.8 | 29.759 |
| Expression 5 | $|r_6|/f$ | 0.275 | 0.297 | 0.32 | 0.3 |
| Expression 6 | $r_7/f$ | 0.815 | 0.675 | 0.61 | 0.74 |

The photographic lens according to the present invention includes first through fourth lenses having the positive, negative, positive, and negative refractive power, respectively, and relations between the first through fourth lenses satisfy at least one of Expressions 1 through 6, and thus, high quality imaging can be maintained for objects at a short focal length (about 10 cm), as well as for objects at a long focal length. In addition, the photographic lens of the present invention has a relatively long back focal length, and thus, the changes in the resolution can be reduced during automatic focusing, and a compact-sized photographic lens can be fabricated.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A photographic lens comprising:
   a first lens having positive refractive power;
   a second lens having negative refractive power and a convex surface facing the object side;
   a third lens having positive refractive power; and
   a fourth lens having negative refractive power at a center portion, in which the negative refractive power becomes weaker from the center portion toward the peripheral portion of the fourth lens, and having a positive refractive power at the peripheral portion thereof,
   wherein the lenses are numbered in order of location from the object side, and,
   wherein the condition $0.9 \leq (r_4+r_5)/(r_4-r_5) \leq 1.8$ is satisfied,
   where $r_4$ denotes the radius of curvature of the surface of the second lens facing the object side, and $r_5$ denotes the radius of curvature of the surface of the second lens facing the image side.

2. The photographic lens of claim 1, wherein the condition $1.4 \leq f/f_1 \leq 1.9$ is satisfied,
   where f denotes the focal length of the entire photographic lens, and $f_1$ denotes the focal length of the first lens.

3. The photographic lens of claim 1, wherein the condition $0.6 \leq f/|f_2| \leq 1.5$ is satisfied,
   where f denotes the focal length of the entire photographic lens, and $f_2$ denotes the focal length of the second lens.

4. The photographic lens of claim 1, further comprising: an aperture stop disposed between the first lens and the object.

5. The photographic lens of claim 4, further comprising: an aperture stop disposed between the first lens and the object.

6. The photographic lens of claim 1, wherein the condition $20 < V_1 - V_2 < 50$ is satisfied,
   where $V_1$ denotes an Abbe constant of the first lens, and $V_2$ denotes an Abbe constant of the second lens.

7. The photographic lens of claim 1, wherein the condition $0.2 \leq |r_7|/f \leq 0.4$ is satisfied,
   where f denotes the focal length of the entire photographic lens, and $r_7$ denotes the radius of curvature of the surface of the third lens facing the image side.

8. The photographic lens of claim 1, wherein the condition $0.5 \leq r_8/f \leq 1.0$ is satisfied,
   where f denotes the focal length of the entire photographic lens, and $r_8$ denotes the radius of curvature of the surface of the fourth lens facing the object side.

9. The photographic lens of claim 1, wherein the fourth lens has at least one aspheric surface.

10. The photographic lens of claim 1, wherein each of the first through fourth lenses has at least one aspheric surface.

11. The photographic lens of claim 1, wherein the third lens is a meniscus lens having a convex surface facing the image side.

12. A photographic lens comprising:
    a first lens having positive refractive power;
    a second lens having negative refractive power at a center portion, in which the negative refractive power becomes weaker from the center portion toward the peripheral portion of the second lens, and having a positive refractive power at the peripheral portion thereof;
    a third lens having positive refractive power; and
    a fourth lens having negative refractive power,
    wherein the lenses are numbered in order of location from the object.

13. The photographic lens of claim 12, wherein the fourth lens has negative refractive power at a center portion, which becomes weaker from the center portion toward the peripheral portion of the fourth lens, and has a positive refractive power at the peripheral portion thereof.

14. The photographic lens of claim 12, wherein the condition $1.4 \leq f/f_1 \leq 1.9$ is satisfied,
    where f denotes the focal length of the entire photographic lens, and $f_1$ denotes the focal length of the first lens.

15. The photographic lens of claim 12, wherein the condition $0.6 \leq f/|f_2| \leq 1.5$ is satisfied,
    where f denotes the focal length of the entire photographic lens, and $f_2$ denotes the focal length of the second lens.

16. The photographic lens of claim 12, wherein the condition $20 < V_1 - V_2 < 50$ is satisfied,
    where $V_1$ denotes an Abbe constant of the first lens, and $V_2$ denotes an Abbe constant of the second lens.

17. The photographic lens of claim 12, wherein the condition $0.2 \leq |r_7|/f \leq 0.4$ is satisfied,
    where f denotes the focal length of the entire photographic lens, and $r_7$ denotes the radius of curvature of the surface of the third lens facing the image side.

18. The photographic lens of claim 12, wherein the condition $0.5 \leq r_8/f \leq 1.0$ is satisfied, where f denotes the focal length of the entire photographic lens, and $r_8$ denotes the radius of curvature of the surface of the fourth lens facing the object side.

19. The photographic lens of claim 12, wherein the fourth lens has at least one aspheric surface.

20. The photographic lens of claim 12, wherein each of the first through fourth lenses has at least one aspheric surface.

21. The photographic lens of claim 12, wherein the third lens is a meniscus lens having a convex surface facing the image side.

22. The photographic lens of claim 12, wherein the condition $0.5<(r_4+r_5)/(r_4-r_5)<1.8$ is satisfied, where $r_4$ denotes the radius of curvature of the surface of the second lens facing the object, and $r_5$ denotes the radius of curvature of the surface of the second lens facing the image side.

23. A photographic lens comprising:

a first lens having positive refractive power;

a second lens having negative refractive power and a convex surface facing the object side;

a third lens having positive refractive power; and a fourth lens having negative refractive power at a center portion, in which the negative refractive power becomes weaker from the center portion toward the peripheral portion of the fourth lens, and having a positive refractive power at the peripheral portion thereof, wherein the lenses are numbered in order of location from the object side.

24. The photographic lens of claim 23, wherein each of the first through fourth lenses has at least one aspheric surface.

* * * * *